United States Patent [19]

Clark, Jr.

[11] 4,415,960
[45] Nov. 15, 1983

[54] LINE VARIABLE OVERCURRENT PROTECTION FOR A VOLTAGE CONVERSION CIRCUIT

[75] Inventor: Charles A. Clark, Jr., Chatsworth, Calif.

[73] Assignee: Sperry Corporation, New York, N.Y.

[21] Appl. No.: 362,941

[22] Filed: Mar. 29, 1982

[51] Int. Cl.³ .......................................... H02M 3/335
[52] U.S. Cl. .......................................... 363/21; 363/56
[58] Field of Search .................. 363/20, 21, 55–57, 363/80

[56] References Cited

U.S. PATENT DOCUMENTS 4,315,303  2/1982  Snyder ............................ 363/80
4,326,245  4/1982  Saleh ............................... 363/21

*Primary Examiner*—William M. Shoop
*Attorney, Agent, or Firm*—Howard P. Terry

[57] ABSTRACT

A voltage converter of the transformer type which incorporates at least one switching transistor coupled to control the application of current to the transformer primary and circuitry for switching the transistor off in response to the current drawn through the primary winding and the level of the input line voltage. Overcurrent shutdown may thus be tailored to approximate constant power dissipation within the voltage converter.

3 Claims, 4 Drawing Figures

LINE VARIABLE OVERCURRENT PROTECTION FOR A VOLTAGE CONVERSION CIRCUIT

BACKGROUND OF THE INVENTION

1. Field of the Invention

This invention relates to voltage conversion circuits and more particularly to protecting such circuits from damage due to overload.

2. Description of the Prior Art

It is known to utilize a transformer in a voltage converter receiving a direct current d.c. voltage. The transformer in such a converter comprises a primary winding and an appropriate secondary winding and will have one or more switching transistors coupled to the primary winding. This switching transistor or transistors are switched on by control signals from a source such as a control signal source to switch an input voltage to the primary winding. In duty cycle control power converters or switching regulators of this type it is common to employ overcurrent circuits which shut off the switching element if either the peak or the average current drawn by the power supply becomes excessive endangering the switching elements or other components. A sample of the converter/switching regulator input current is obtained, often by resistor sampling or by use of a current transformer. This current sample will take the form of a pulse train, the height of the pulses of which provide a voltage analog of the sampled current. The current pulses may be rectangular, sawtooth or of any other shape required by the converter circuit and the load characteristics thereof. This voltage analog may further be low pass filtered to obtain an average voltage or used directly and compared with a reference voltage level in order to determine if over-current has occurred.

According to the prior art, a fixed reference level is used to make this comparison. In flyback or resonant converters, and in forward converters in particular, this may not provide adequate overcurrent protection since wide variations of input line voltage will result in wide variations of peak and average primary current levels drawn under normal operating conditions. Setting the overcurrent reference level above the maximum normal current which occurs at low line voltage results in very high power dissipation in the converter elements if an overcurrent condition occurs at high line voltage. Since the fixed overcurrent reference is usually built into common regulator integrated circuits, it is difficult to alter.

The present invention provides an apparatus for providing an overcurrent level signal that is responsive to both the input line voltage and the current drawn through the converter.

SUMMARY OF THE INVENTION

According to the principles of the present invention a voltage converter of the type including a transformer, a switch in series with the primary of the transformer, means for providing a voltage analog of the current drawn through the primary of the transformer, and a control circuit for turning the switch on and off, provides overcurrent shutdown by sampling both the input line voltage and the current drawn through the transformer primary. The voltage signals sampled from the input line voltage and the transformer primary current may be shaped to provide matching to a desired constant power curve.

BRIEF DESCRIPTION OF THE DRAWINGS

FIG. 3b is a graph of a transfer curve useful in explaining the operation of the signal shaper of FIG. 3a.

DESCRIPTION OF THE PREFERRED EMBODIMENTS

Figure 1:
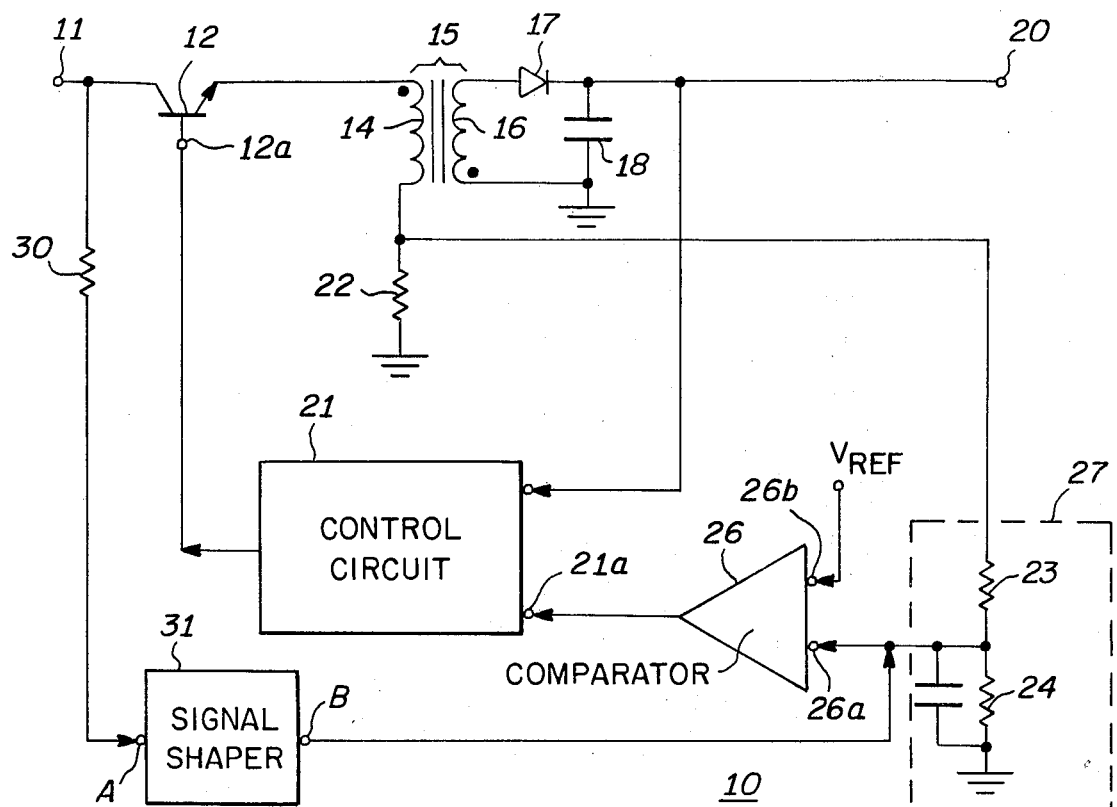
FIG. 1 is a schematic representation of a preferred embodiment of the invention.

Refer now to FIG. 1 wherein is shown a forward voltage converter 10 according to the principles of the present invention. Input terminal 11 is receptive of a d.c. input voltage to be converted to a different voltage and made available for use in a load (not shown) coupled to output terminal 20. NPN transistor 12 provides a means for switchably coupling the input d.c. voltage to the primary 14 of transformer 15. The switched current flowing through transformer primary 14 will induce a current in transformer secondary 16 which current may be rectified and filtered by diode 17 and capacitor 18, respectively. The resulting rectified and filtered output d.c. voltage is then coupled to output terminal 20 where it may be further coupled to the desired load. The output d.c. voltage present at output terminal 20 is also sampled by control circuit 21 which will vary the duty cycle of a signal applied to base terminal 12a of npn transistor 12 in response to the output d.c. voltage.

Control circuit 21 includes an error amplifier and an oscillator for generating variable duty cycle pulses. The error amplifier includes provision for comparing the sampled voltage to an internal reference voltage, and varies the pulse duty cycle depending upon the outcome of the comparison. Control circuit 21 also includes a circuit for shutting off all pulses to transistor 12, responsive to a signal, ordinarily an overcurrent signal, which is coupled to terminal 21a. The transistor 12 switches on and off in accordance with the signal received from control circuit 21 applied to the transistor's base. It will be clear to those skilled in the art that other switching elements may be utilized in place of transistor 12, for example JFET's, power MOSFET's or electromechanical devices.

Resistor 22 is a current sampling resistor coupled in series with the primary of transformer 14. Current will flow through the primary circuit, comprised of transformer primary 14 and resistor 22, causing a voltage drop across resistor 22. This voltage drop is sampled and filtered by a low pass filter network 27 comprised of resistor 23, resistor 24 and capacitor 25. Low pass filter network 27 essentially establishes an average voltage corresponding to the d.c. pulse train obtained across sampling resistor 22 to provide a relatively constant d.c. voltage to an input terminal 26a of comparator 26. Additionally, the ratio of resistor 23 to 24 in conjunction with the value of sensing resistor 22 will determine the value of the voltage signal applied to terminal 26a of comparator 26.

A fixed voltage reference, $V_{REF}$, is applied to terminal 26b of comparator 26 so that comparator 26 generates an output signal coupled to terminal 21a which causes control circuit 21 to shut down and turn transistor 12 off.

Resistor 30 is coupled to input terminal 11 and provides a sample of the input d.c. voltage which is in turn coupled to signal shaper 31, the operation of which will be explained below. An output signal from the signal shaper 31 is coupled to input terminal 26a of comparator 26 where it is summed with the output of the low pass filter network 27. The voltage converter may thus be made to react to overcurrent levels at lower levels when the line voltage is high and at higher levels when the line voltage is low, since the overcurrent signal will correspond to the combination of the transformer primary current and input line voltage.

Figure 2:
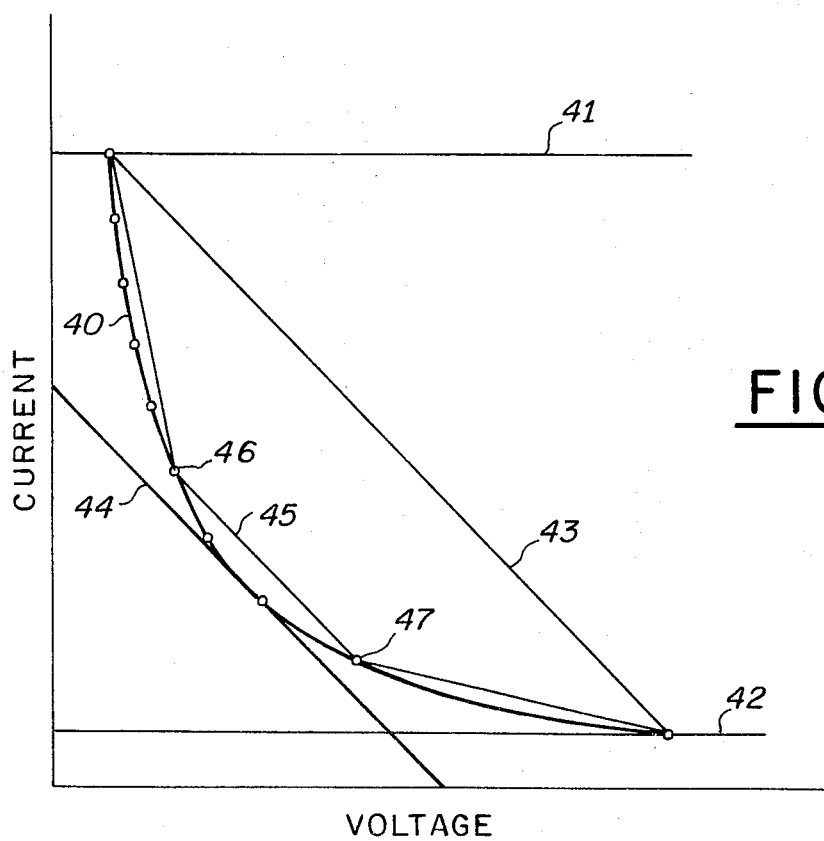
FIG. 2 is a graph of voltage versus current useful in explaining the operation of the invention.

The operation of the invention may be further understood by reference to FIG. 2. Curve 40 represents a constant power curve such as might be utilized to establish the safe operating area of a semiconductor device. Such a curve, which is hyperbolic in shape, indicates the maximum current versus voltage levels obtainable for a predetermined power level and approaches the current and voltage axes asymptotically. In ordinary overcurrent protection circuitry a fixed current level is selected as is indicated by lines 41 and 42. Line 41 represents a fixed current reference level which often refers to the highest current the converter can pass at normal line voltage without damage. In those situations, however, where the line voltage rises above normally expected values it is clear that the power dissipated in the voltage regulator will exceed the converter's maximum permissible power dissipation. To avoid dissipating more power than is desired in the voltage converter, a fixed reference level may be set at the lower level indicated by line 42 which, however, has the disadvantage of setting an unacceptably low current thhreshold for normal line operation.

The present invention tailors the overcurrent limit to approximate the shape of the desired constant power overcurrent level indicated by curve 40. The accuracy of the approximation will depend upon signal shaper 31. For example, by properly choosing the values of resistors 23, 24, and 30, signal shaper 31 may be dispensed with and a linear approximation to curve 40 as shown by line 43 or 44 is obtained. If it is not permissible to exceed the desired constant power overcurrent level 40 at specific voltages and currents, as shown by line 43, then the more conservative linear approximation shown by line 44 may be utilized.

Figure 3A:
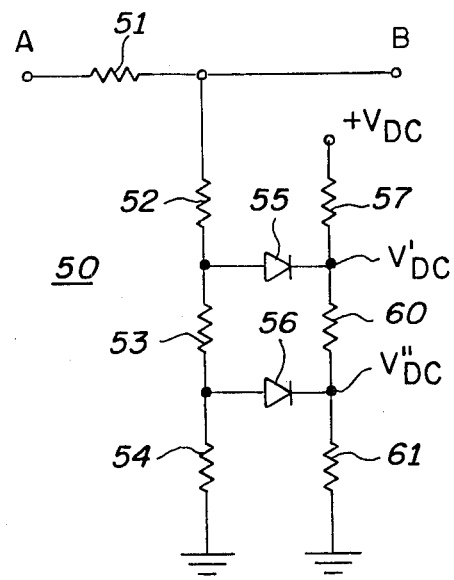
FIG. 3a is a schematic representation of an embodiment of a signal shaper.

Should it be desirable to make a closer approximation to curve 40, well known op-amp or diode and resistor shaping networks may be used as signal shaper 31, thus permitting the desired constant power overcurrent level to be approximated with whatever degree of accuracy desired. Refer now to FIG. 3, wherein is shown a typical diode/resistor shaping network 50 having a known non-linear transfer function. The voltage $V_A$ coupled to terminal A will be shaped non-linearly by the network so that a voltage $V_B$, available at terminal B, does not track $V_A$ linearly.

Figure 3B:
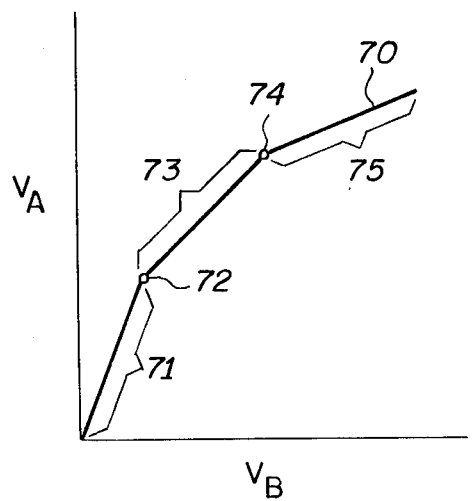

In operation resistors 51, 52, 53, and 54 are coupled between terminal A and ground and act as a first resistive divider. Similarly resistors 57, 60, and 61 are coupled between a fixed voltage $V_{DC}$ and ground acting as a second resistive divider. The junctions of resistors 52 and 53 are coupled to the junction of resistors 57 and 60 via diode 55 and the junctions of resistors 53 and 54 and coupled to the junctions of resistors 60 and 61 via diode 56. The second resistive divider comprising resistors 57, 60 and 61 will provide predetermined voltages at the junctions of resistors 57 and 60 and of 60 and 61 which are determined by the values of resistors 57, 60 and 61 and $+V_{DC}$ and indicated respectively as $V'_{DC}$ and $V''_{DC}$. At $V_A = 0$ volts both diodes 55 and 56 will be reversed biased and therefore the first resistive divider consisting of resistor 51, 52, 53, and 54 will behave linearly as an ordinary resistive divider. This behavior is shown in FIG. 3B as region 71 of curve 70. As voltage $V_A$ increases past a predetermined level the voltage drop across resistor 54 will be great enough to equal $V''_{DC}$ thus causing diode 56 to be forward biased and essentially placing resistor 61 in parallel with resistor 54. This voltage level is shown as point 72 on curve 70. The parallel operation of resistors 54 and 61 will increase the current flow through the first resistive divider, thus increasing the voltage drop across resistor 51 and consequently decreasing voltage $V_B$. This operation is shown as region 73 of curve 70; operation within this region will continue linearly until the second break point 74 is reached. At this point the voltage available at the junction of resistors 52 and 53 will be equal to $V'_{DC}$ thus forwarding biasing diode 55 which now essentially places resistor 60 in parallel with resistor 53. Such parallel operation will further increase the current flow through the first resistive divider thereby increasing the voltage drop across resistor 51 and decreasing the voltage $V_B$. This operation is indicated by region 75. Thus the output voltage $V_B$ will be related non-linearly to the input voltage $V_A$.

When the passive shaping network 50 is used for signal shaper 31, the break points may be selected such that current versus voltage curve 45 results, having break points 46 and 47 in correspondence to break points 72 and 74. The voltage summed at input terminal 26a of comparator 26 with the voltage analog derived from resistor 22 will thus reflect changes in the line voltage and current drawn by the load in a manner tailored to approximate the desired constant power overcurrent curve 40.

It will be clear to those skilled in the art that more complex resistive/diode shaper networks will permit closer matching to curve 40. It will also be clear that in lieu of scaling the appropriate impedances a buffer amplifier and series resistor may be coupled between point B and input terminal 26a to avoid loading the output of signal shaper 31 with the network 27. Alternatively, well known active non-linear shaping networks utilizing operational amplifiers may also be used for signal shaper 31.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An improved voltage converter of the type responsive to an input d.c. voltage on an input line for providing an output voltage to a load, said converter including a transformer having a primary and a secondary winding, sensor means comprising a resistor coupled in series with said primary winding for providing a voltage analog of current in said primary winding, switching means coupled in series with said primary winding, control circuit means coupled to said sensor means for opening said switching means in response to signals received from said primary winding, and low pass filter means coupled betweem said control circuit means and said sensor means, wherein the improvement comprises:

means, comprising a resistor coupled to said primary winding, coupled to said input line for sampling said input d.c. voltage; and means, coupled to said input d.c. voltage sampling means, for augmenting said voltage analog with said input d.c. voltage sample, said augmenting means including means, comprising a passive non-linear signal shaping network, for shaping said input d.c. voltage.

2. The apparatus according to claim 1 wherein said passive non-linear signal shaping network comprises:

an input terminal;

first, second, third and fourth resistors coupled in series relationship between said input terminal and ground potential;

fifth, sixth, and seventh resistors coupled in series relationship between a predetermined d.c. voltage and said ground potential;

first diode coupled between a junction of said second and third resistors and a junction of said fifth and sixth resistors;

second diode coupled between a junction of said third and fourth resistors and said sixth and seventh resistors; and an output terminal coupled between a junction of said first resistor and said second resistor.

3. The apparatus according to claim 2 wherein said first and second diodes are reverse biased for input voltages applied to said input terminal less than said predetermined d.c. voltage.

* * * * *